United States Patent [19]

Danzy

[11] Patent Number: 5,174,321
[45] Date of Patent: Dec. 29, 1992

[54] METHOD AND APPARATUS FOR DETERMINING SET PRESSURE OF PILOT OPERATED PRESSURE RELIEF VALVE

[75] Inventor: Roger D. Danzy, Pineville, La.
[73] Assignee: Dresser Industries, Inc., Dallas, Tex.
[21] Appl. No.: 830,986
[22] Filed: Feb. 4, 1992

Related U.S. Application Data

[63] Continuation of Ser. No. 669,690, Mar. 14, 1991, abandoned.

[51] Int. Cl.⁵ .............................................. G05D 16/10
[52] U.S. Cl. ...................................... 137/14; 137/489; 137/492
[58] Field of Search ............ 137/488, 489, 492, 492.5, 137/1, 14, 557; 251/129; 73/37

[56] References Cited

U.S. PATENT DOCUMENTS

| | | | |
|---|---|---|---|
| 3,872,875 | 3/1975 | Raidl, Jr. | 137/71 |
| 4,402,341 | 9/1983 | Reip | 137/489 |
| 4,480,653 | 11/1984 | Vanderburg | 137/112 |
| 4,527,770 | 7/1985 | Vanderburg | 251/26 |
| 4,548,067 | 10/1985 | Cox | 73/4 |
| 4,615,356 | 10/1986 | Reip | 137/488 |
| 4,646,556 | 3/1987 | Courcoux et al. | 73/4 |
| 4,669,493 | 6/1987 | Kober | 137/489 X |
| 4,682,495 | 7/1987 | McNeely | 73/168 |
| 4,761,999 | 8/1988 | Thompson | 73/168 |
| 4,840,057 | 6/1989 | Bingham | 73/4 |
| 4,852,387 | 8/1989 | Bingham | 73/4 |

*Primary Examiner*—Alan Cohan
*Attorney, Agent, or Firm*—Hubbard, Thurman, Tucker & Harris

[57] ABSTRACT

A testing system for a pilot operated, pressure relief valve of the type wherein movement of the pilot in response to a predetermined line pressure effects the opening of the pressure relief valve comprising a portable apparatus including a source of test fluid pressure, a flow regulating test valve connected to the test pressure source and a piston in the test valve movable in response to the rate of fluid flow through the test valve. The output end of the test valve is connected to a two branch line, one branch line connecting the test valve to the inlet passage of the pilot and the other branch line connecting the test valve to a trapped fluid pressure chamber of the relief valve which is vented by the opening movement of the pilot. A pressure gauge is also connected to the test valve and a plunger on the piston effects the isolation of the pressure gauge when the piston is moved by the increased flow produced through the test valve by the opening of the pilot.

11 Claims, 2 Drawing Sheets

METHOD AND APPARATUS FOR DETERMINING SET PRESSURE OF PILOT OPERATED PRESSURE RELIEF VALVE

This application is a continuation of application Ser. No. 07/669,690, filed Mar. 14, 1991 now abandoned.

BACKGROUND OF THE INVENTION

1. FIELD OF THE INVENTION

The invention relates to a testing system for a pilot operated, pressure relief valve which can be utilized to determine the setpoint of the relief valve without removing the relief valve from the line in which it is connected, or opening of the pressure relief valve.

2. SUMMARY OF THE PRIOR ART

Pilot operated safety valves or pressure relief valves are incorporated in practically every tank or line carrying fluid under substantial pressures. Various governmental agencies require the periodic testing of the setpoint of such pressure relief valves, or in other words, the line pressure at which the pilot will be actuated to in turn effect the opening of the pressure relief valve to vent the line the pilot which will close the opened relief valve.

Two types of pilot operated relief valves are currently in use. One is a modulating, non-flowing pressure operated relief valve of the type shown in U.S. Pat. No. 4,615,356. This valve incorporates as part of its structure a field test valve which requires the addition of a source of test pressure to make the test valve operable. Obviously, the incorporation of a test substantially increases the cost of such safety valves. Other testing arrangements require the removal of the entire valve from the system or the determination of the set pressure and closing pressure of the pilot operated safety valve by venting system media, which is highly undesirable. Flowing, modulating pilot valves present similar problems for determining the pilot setpoint.

There is a need therefore for a test valve system for pilot operated safety valves which is portable and which will effect the determination of the setpoint of the pilot of such safety valve, whether of the flowing or non-flowing type, without requiring the removal of the safety valve from the system or the venting of system media.

SUMMARY OF THE INVENTION

A testing apparatus for pilot operated safety relief valves, either of the modulating or non-flowing type, embodying this invention comprises a source of test pressure, a test valve, a pressure gauge, and a two branch line leading to the safety valve to be tested and having detachable connections therewith. The test valve comprises a cylinder having one axial end of the cylinder connected directly to the source of test pressure through a conventional manually operable valve. The other end of the cylinder is connected to a line having two branches which are connected to the safety relief valve to be tested. The one branch is connected to the fluid pressure inlet for the pilot of the pilot operated safety relief valve, while the other branch is connected what is called the "head," or trapped fluid pressure chamber, which maintains a pressure on the main piston element of the safety valve to secure it in a closed position. As is customary in such valves, the operation of the pilot valve effects a venting of the pressure in the head or trapped fluid pressure chamber of the main valve, thus permitting the line pressure to effect the shifting of the main piston element to an open venting position.

A pressure gauge is also connected to the other axial end of the cylinder bore of the test valve for recording the fluid pressure at which the pilot valve is actuated.

Within the cylinder bore, a loose fitting piston is mounted for axial movement. The piston is not sealably engaged with the bore so that test fluid pressure can flow around the piston and out of the cylinder bore to the two branch lines and to the pressure gauge. The pressure gauge communicates with the adjacent end of the cylinder by an axial passage containing an annular seal element. An axial plunger on the face of the piston adjacent the pressure gauge enters the axial passage and effects a trapping of the fluid pressure then imposed on the pressure.

The piston is, however, biased by a spring to a position away from the axial passage so that the test pressure reading on the pressure gauge is not accomplished until sufficient flow is produced through the double branched exit passage from the cylinder bore so as to produce a pressure differential across the piston which will cause it to move against the spring bias to effect the trapping of fluid pressure on the pressure gauge.

As a manually operated valve in the line leading to the source of test pressure is opened, the amount of fluid pressure applied to the inlet of the pilot will be gradually increased until a level is reached sufficient to effect a shifting of the pilot. The shifting of the pilot opens a venting passage for the head or trapped fluid pressure chamber existing above the closed position due to the fact that the test pressure is concurrently being supplied to the head through a larger area passage than that provided by the venting action of the pilot valve. Thus, the pilot valve can be actuated without effecting the operation of the main valve, thus eliminating any possibility of venting system media.

At the same time, the substantial increase in rate of flow of fluid through the two branch lines leading respectively to the pilot inlet and the trapped fluid pressure chamber or head across the piston in the test valve so as to effect the shifting of such piston toward the axial passage leading to the pressure gauge, thus sealing off and trapping the pressure in the pressure gauge to provide a reading of the actual test pressure at which the pilot valve was shifted to a vent opening position.

The restoration of the system to normal is readily accomplished by first manually closing off the source of test pressure. The pilot continues to vent until its closing or re-set pressure is reached. This stops fluid flow through the test valve back to its normal position releasing the trapped pressure acting on the pressure gauge and providing a reading of the pilot re-set pressure.

Further advantages of the testing system embodying this invention will be readily apparent to those skilled in the art from the following detailed description taken in conjunction with the annexed sheets of drawings on which is shown a preferred embodiment of the invention.

DESCRIPTION OF THE PREFERRED EMBODIMENT

Figure 1:
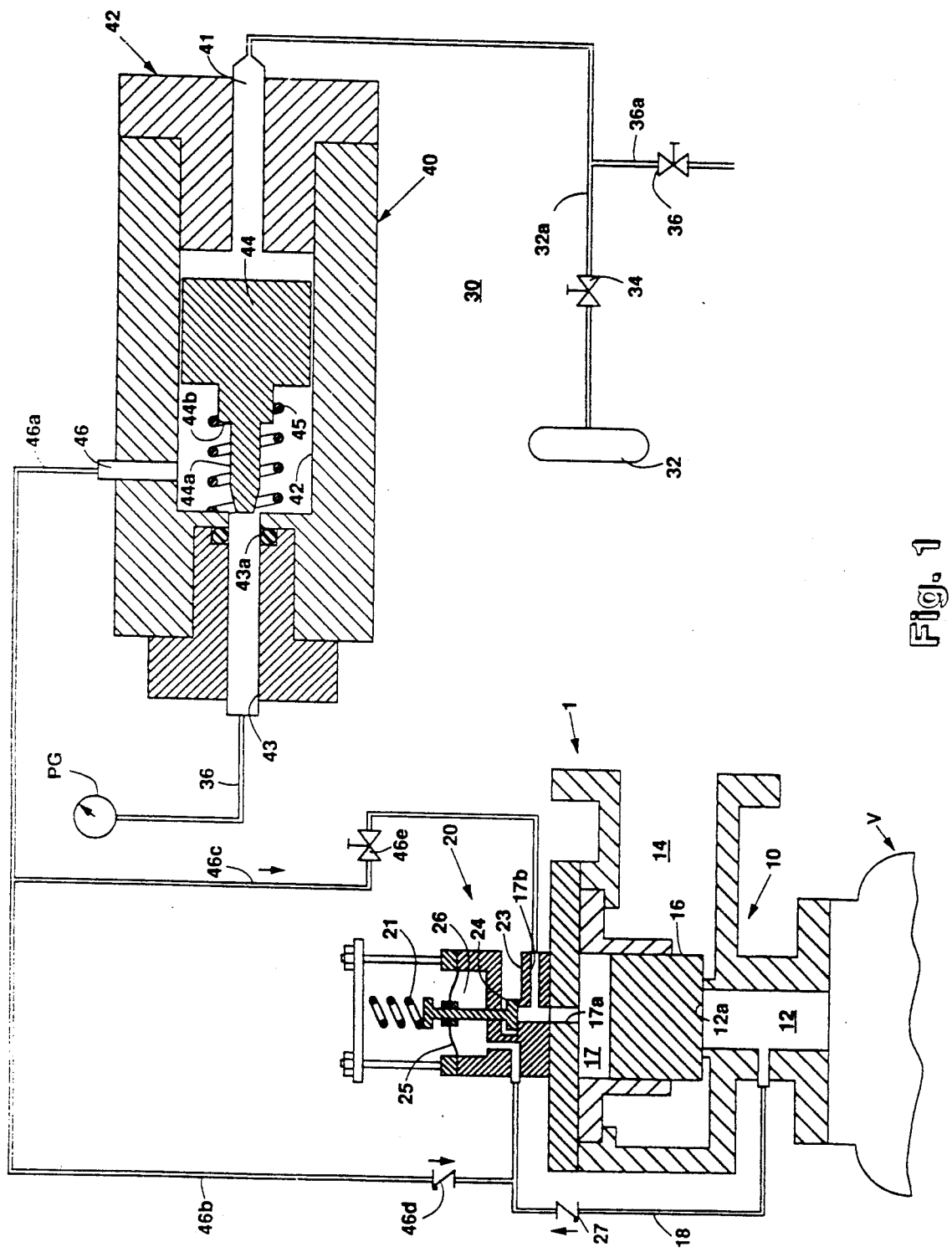
FIG. 1 is a schematic view of a testing system for pilot operated safety relief valves embodying this invention, with the elements of the system shown in their pre-set positions.

Referring to FIG. 1, a conventional pilot operated pressure relief valve 1 is schematically illustrated as comprising a main valve housing 10 to which is affixed a pilot valve housing 20. The main valve housing 10 incorporates a fluid passage 12 leading to a vessel V or any other source of fluid pressure for which the valve functions as a safety valve. The main valve housing 10 is further provided with a venting or exhaust passage 14 and communication between passage 12 and passage 14 is normally blocked by a main piston valve 16 which is held in sealing relationship with an annular valve seat 12a by fluid pressure existing within a trapped fluid pressure chamber 17 defined above the piston 16.

A fluid passage 17a communicates between the trapped fluid pressure chamber or head 17 and a venting passage 23 defined in the pilot housing 20. A pilot valve head 24 normally prevents communication between passage 17a and venting passage 23, being urged to such closed position by a spring 21.

Figure 2:
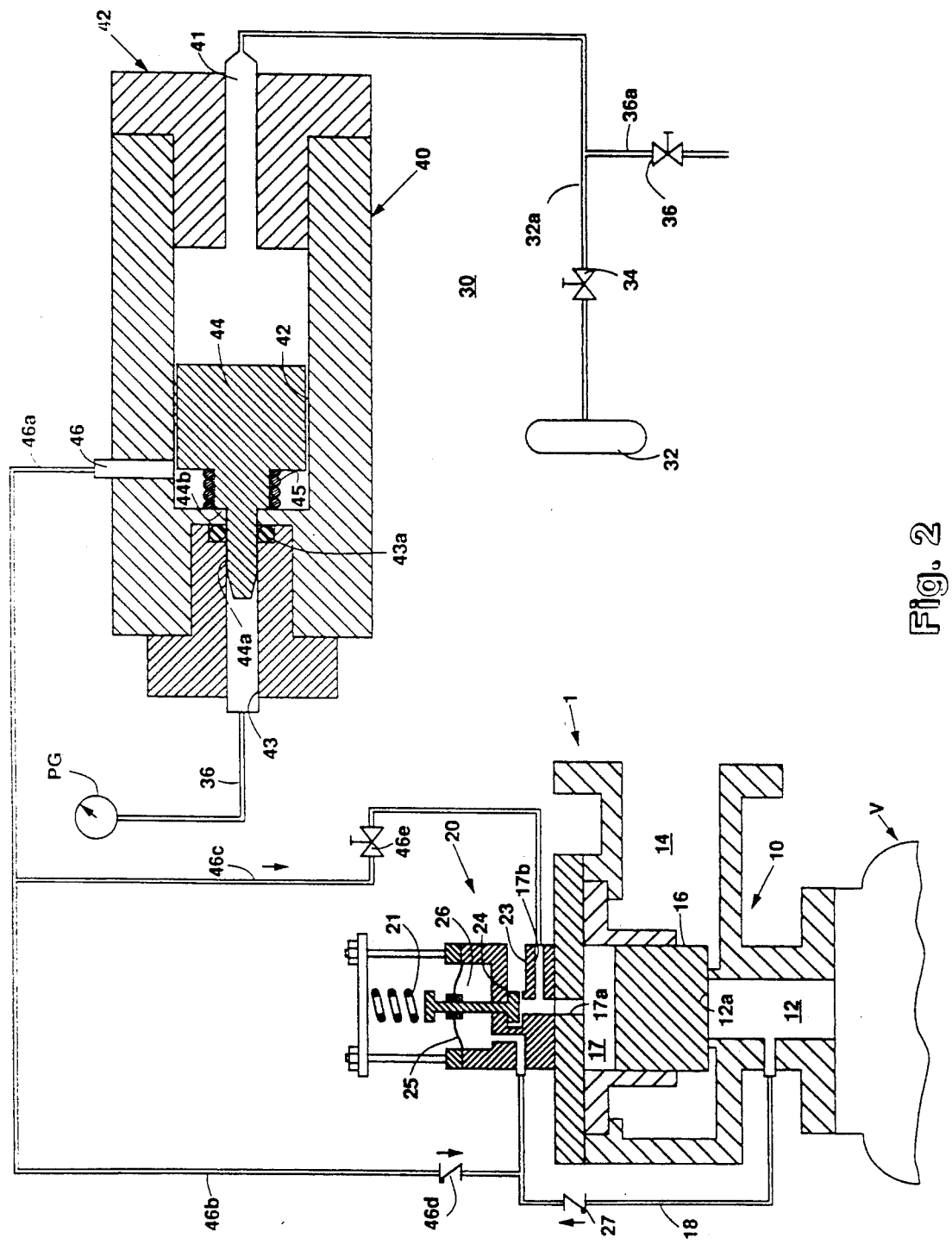
FIG. 2 is a view similar to FIG. 1 but showing the elements of the valves in their positions assumed when the pilot valve is actuated by test pressure to a venting position.

Valve head 24 is shiftable to an open or venting position, as shown in FIG. 2, through the application of fluid pressure derived from the vessel V by virtue of line 18 and check valve 27, which acts upon a diaphragm 25 secured to valve head 24 and disposed across a chamber 26. Obviously, the valve head 24 could be operated by a piston or other equivalent fluid pressure responsive elements.

Thus in the normal operation of the pilot operated safety valve 1, when the fluid pressure within the vessel V reaches a predetermined level, at which it is desired that the safety valve be actuated, such pressure is applied to the diaphragm 25 to effect the upward movement of the valve head 24 and the venting of the head 17 though passages 17a and 23. This permits the piston 16 to move upwardly and establish communication between the passage 12 and the main exhaust passage 14.

To periodically test the setpoint of the pilot valve, a testing apparatus 30 embodying this invention is provided. Such testing apparatus comprises a source of pressure 32, which may conveniently comprise a portable tank of pressurized non-toxic gas, a test valve unit 40 and a pressure gauge PG.

Test valve unit 40 comprises a conventional housing having an axial inlet port 41 at one end which communicates with cylinder bore 42. The other end of cylinder bore 42 is provided with an axial passage 43 which communicates with the pressure gauge PG through line 36. Within the cylinder bore 42, a piston 44 is slidably but non-sealably mounted therein so as to permit Piston 44 is biased away from the axial passage 43 by a spring 45.

A radial port 46 communicates with the end of the piston 44 remote from the inlet passage 41 and communicates through line 46a to branch lines 46b and 46c. The one branch line 46b is detachably connected through a check valve 46d to the inlet line 18 for the pilot unit 10 of the safety valve. The other branch line 46c is connected through a manually operable valve 46e to a passage 17b communicating with the passage 17a which constitutes the pressure venting passage for the fluid pressure chamber 17. While not shown, the connection of the branch lines 45b and 45c to the pilot safety valve may be accomplished through utilization of conventional detachable connectors which automatically effect a closing of the passages to which the branch lines 46b and 46c communicate when the detachable connection is interrupted.

Lastly, a line 32a connects the test pressure source 32 to the inlet passage 41 of the test valve 40 through a manually operable valve 34. A venting valve 36 is connected by a line 36a to the line 32 for a purpose to be hereinafter described.

In the operation of the aforedescribed pilot test system, the manual valve 34 is opened producing a flow of fluid pressure through into the test valve 40, around the piston 44 and into the two branch conduits 46b and 46c. Manual valve 46e in branch conduit 46c is opened.

As the pressure builds up in the chamber 26 underlying the diaphragm 25, no significant flow of test fluid through the test valve 40 occurs. The test pressure is, of course, in excess of the rated set pressure of the safety valve 1. As the test pressure supplied to the chamber 26 through the conduit branch 46b rises, it will eventually reach the setpoint of the pilot to initiate venting of fluid from the pressured fluid trapped in the chamber 17. However, any pressure lost through the shifting of the valve head 24 to the position shown in FIG. 2 will be immediately made up by the direct pressure connection through the branch line 46c, hence the effective fluid pressure within the trapped fluid pressure chamber 17 will remain substantially the same. Thus, the main piston 16 will not be shifted from its closed position.

The increased flow of fluid through the branch lines 46b and 46c will produce a greatly increased rate of flow of fluid around the piston 44. This will result in the creation of a pressure differential across the piston 44, creating a force which will bias the piston to the left as viewed in the drawings, against the bias of spring 27. As the piston moves to the left, an integral plunger portion 44a on the piston enters the axial passage 43 and cooperates with the seal 43a to trap the fluid pressure supplied to the pressure gauge PG. A shoulder 44b on plunger portion 44a prevents piston 44 from overlapping radial port 45. See FIG. 2. Thus, a stable reading can be obtained on the pressure gauge PG of the actual fluid pressure at which the pilot of the safety valve 1 was set.

The manually operated valve 34 supplying the test fluid pressure and the valve 46e are then closed. The pilot continues to vent until the closing point of the pilot is reached. This returns the system to the condition indicated in FIG. 1 wherein there is no significant flow of test fluid through the test valve 40. Thus, the piston 44 will be returned to its initial position by the spring 46 and the pressure gauge PG will no longer be sealed off and will record the pressure in chamber 10 which will, of course, be equal to the closing pressure of the pilot. All pressure in test valve 40 may be vented by opening vent valve 36.

Thus, both the opening and closing pressures of the pilot operated safety valve may be expeditiously and reliably obtained through the utilization of the method and apparatus of this invention. Moreover, no opening of the main valve element of the pilot operated safety relief valve 1 is required so that discharge of media contained in the vessel V will be eliminated.

Although the invention has been described in terms of specified embodiments which are set forth in detail, it should be understood that this is by illustration only and that the invention is not necessarily limited thereto, since alternative those skilled in the art in view of the disclosure. Accordingly, modifications are contemplated which can be made without departing from the spirit of the described invention.

What is claimed and desired to be secured by Letters Patent is:

1. A testing system for a pilot operated relief valve of the type wherein movement of the pilot in response to line pressure effects the opening of the pressure relief valve; said pilot having a line pressure fluid inlet passage and said pressure relief valve having a trapped fluid pressure chamber closed by the pilot in one position to maintain the valve closed, but opened to an exhaust passage in the other position a source of test fluid pressure having a pressure at least equal to the rated opening pressure of the pressure relief valve;
 a test valve connected to said test pressure source;
 said test valve having a cylinder bore and a piston non-sealably mounted in said cylinder bore intermediate the ends of said cylinder bore;
 means connecting one end of said cylinder bore to said test pressure source;
 means connecting the other end of said cylinder bore to a test line having two branches;
 means for connecting one of said test line branches to said pilot fluid inlet passage;
 means for connecting the other test line branch to said trapped pressure chamber;
 a pressure gauge;
 means for connecting said pressure gauge to said other end of said cylinder bore, whereby the opening of said pilot by said test pressure produces substantial fluid flow around said piston to generate a pressure force on said piston to move said piston toward said other end of said cylinder bore: and
 valve means operable by said piston movement to trap the fluid pressure supplied to said pressure gauge, thereby producing an indication of the pressure required to open said pilot.

2. The apparatus of claim 1 further comprising resilient means for urging said piston toward said first end of said cylinder bore.

3. The apparatus of claim wherein said means for connecting said pressure gauge to said other end of said cylinder bore comprises an axial passage in said test valve communicating with said other end of said cylinder bore; and said valve means comprises a coaxial plunger on said cylinder sealingly engageable in said axial passage by said movement of said piston to said other end of said cylinder bore.

4. The apparatus of claim 3 further comprising a compression spring surrounding said plunger and urging said piston toward said one end of said cylinder bore.

5. In combination with a pilot actuated pressure relief valve operably connected in a fluid pressure line, said pressure relief valve having a main piston, disposed between the line fluid pressure and a trapped fluid pressure, said main piston being shiftable to vent said line pressure when said line pressure reaches a predetermined level, said trapped fluid to the application of said predetermined fluid pressure to the pilot valve inlet; the improvement comprising:

a source of test fluid pressure having a pressure at least equal to the rated opening pressure of the pressure relief valve;
 a test valve connected to said test pressure source;
 said test valve having a cylinder bore and a piston non-sealably mounted in said cylinder bore intermediate the ends of said cylinder bore;
 means connecting one end of said cylinder bore to said test pressure source;
 means connecting the other end of said cylinder bore to a test line having two branches;
 means for connecting one of said test line branches to said pilot fluid inlet passage;
 a pressure gauge;
 means for connecting said pressure gauge to said other end of said cylinder bore, whereby the opening of said pilot by said test pressure produces substantial fluid flow around said piston to generate a pressure force on said piston to move said piston toward said other end of said cylinder bore; and
 valve means operable by said piston movement to trap the fluid pressure supplied to said pressure gauge, thereby producing an indication of the pressure required to open said pilot.

6. The apparatus of claim 5 further comprising resilient means for urging said piston toward said first end of said cylinder bore.

7. The apparatus of claim 5 wherein said means for cylinder bore comprises an axial passage in said test valve cylinder bore comprises an axial passage in said test valve communicating with said other end of said cylinder bore; and said valve means comprises a coaxial plunger on said cylinder sealingly engageable in said axial passage by said movement of said piston to said other end of said cylinder bore.

8. The apparatus of claim 7 further comprising a compression spring surrounding said plunger and urging said piston toward one end of said cylinder bore.

9. A method of testing a pressure relief valve connected in a pressurized fluid line without opening the relief valve, the pressure relief valve having a pilot for venting closing pressure holding the pressure relief valve closed when the line fluid pressure in the pressurized fluid line exceeds a predetermined value, the method comprising the steps of:

providing a test valve having a flow metering piston movable in a cylinder bore by flow around the piston between an open and closed position relative to a pressure gauge; the test valve including a spring bias urging said piston to said open position;
 connecting said test valve between a two branch testing line and a source of test fluid pressure having a pressure at least equal to the predetermined value of the pressure at which the pilot vents closing pressure on the pressure relief valve; the first branch of said test line detachably connected to a pressurized fluid input to said pilot and the second branch of said testing line detachably connected to a relief passage through which closing pressure on said pressure relief valve is vented; and
 flowing the test fluid pressure from said source of test fluid pressure through the test valve to the two-branch testing line; the test fluid pressure in the first branch lifting said pilot and, the test fluid pressure in the second branch maintaining at least a minimum closing pressure on the relief valve; the combined fluid flow through both said branches of said test line producing a pressure differential across said piston sufficient to shift said piston to said closed relative to said pressure gauge to trap a reading of fluid pressure required to shift said pilot to its valve opening position.

10. The method of claim 9 further comprising the step of interrupting fluid flow from said test fluid pressure source to said test valve and closing the second branch line, whereby the subsequent closing of said pilot eliminates flow through said test valve to permit return of said test valve piston to an open position relative to said pressure gauge to indicate the closing pressure of said pilot.

11. The method of claim 10 further comprising the step of venting the pressure in said cylinder bore to return said pressure gauge and said test piston to pre-test positions.

* * * * *

UNITED STATES PATENT AND TRADEMARK OFFICE
CERTIFICATE OF CORRECTION

PATENT NO. : 5,174,321

DATED : December 29, 1992

INVENTOR(S) : Roger D. Danzy

It is certified that error appears in the above-identified patent and that said Letters Patent is hereby corrected as shown below:

Column 1, line 24, "line the" should be -- line pressure. It is also desirable to know the re-set pressure of the --.

Column 1, line 32, "test substantially" should be -- test valve as part of each pilot operated safety valve substantially --.

Column 2, line 32, "the closed" should be -- the main valve piston. Such piston does not, however, move from its closed --.

Column 2, line 42, "head across" should be -- head of the main valve, produces a sufficient pressure differential across --.

Column 2, line 52, "test valve" should be -- test valve and permits the spring to move the piston of the test valve --.

Column 3, line 54, "permit Piston" should be -- permit at all times constricted fluid flow around its periphery. Piston --.

Column 4, line 21, "pilot to" should be -- pilot and the valve head 24 will lift, against the bias of spring 21, to --.

Column 4, line 67, "alternative those" should be -- alternative embodiments and operating techniques will become apparent to those --.

Column 5, line 12, after "position", insert -- of said pilot, comprising: --.

UNITED STATES PATENT AND TRADEMARK OFFICE
CERTIFICATE OF CORRECTION

PATENT NO. : 5,174,321

DATED : December 29, 1992

INVENTOR(S) : Roger D. Danzy

It is certified that error appears in the above-identified patent and that said Letters Patent is hereby corrected as shown below:

Column 5, line 42, "claim wherein" should be -- claim 1 wherein --.

Column 5, line 61, "fluid to" should be -- fluid pressure being vented by movement of a pilot valve in response to --.

Column 6, line 9, after "passage;", insert -- means for connecting the other test line branch to said trapped pressure chamber; --.

Column 6, line 24, after "for", insert -- connecting said pressure gauge to said other end of said --.

Column 6, lines 26-27, delete "cylinder bore comprises an axial passage in said test valve".

Column 6, line 68, "closed relative" should be -- closed position relative --.

Signed and Sealed this

Ninth Day of November, 1993

Attest:

BRUCE LEHMAN

*Attesting Officer*  *Commissioner of Patents and Trademarks*